US009836529B2

United States Patent
Zelevinsky et al.

(10) Patent No.: US 9,836,529 B2
(45) Date of Patent: Dec. 5, 2017

(54) SEMANTIC TEXT SEARCH

(71) Applicant: Oracle International Corporation, Redwood Shores, CA (US)

(72) Inventors: Vladimir Zelevinsky, Sharon, MA (US); Yevgeniy Dashevsky, Bedford, MA (US); Diana Ye, Somerville, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 415 days.

(21) Appl. No.: 14/643,390

(22) Filed: Mar. 10, 2015

(65) Prior Publication Data

US 2016/0085853 A1 Mar. 24, 2016

Related U.S. Application Data

(60) Provisional application No. 62/053,283, filed on Sep. 22, 2014.

(51) Int. Cl.
*G06F 17/00* (2006.01)
*G06F 17/30* (2006.01)
*G06F 17/27* (2006.01)

(52) U.S. Cl.
CPC ...... *G06F 17/30672* (2013.01); *G06F 17/271* (2013.01); *G06F 17/2785* (2013.01); *G06F 17/30696* (2013.01)

(58) Field of Classification Search
CPC . G06F 17/27; G06F 17/2785; G06F 17/30684
USPC .......................................................... 704/9
See application file for complete search history.

(56) References Cited

U.S. PATENT DOCUMENTS

| | | | |
|---|---|---|---|
| 6,081,774 A | 6/2000 | de Hita et al. | |
| 7,027,974 B1 | 4/2006 | Busch et al. | |
| 7,698,259 B2 | 4/2010 | Xue | |
| 8,112,436 B2 | 2/2012 | Lu et al. | |
| 8,180,754 B1 | 5/2012 | Ershov | |
| 8,244,726 B1 | 8/2012 | Matesso et al. | |
| 8,533,208 B2 | 9/2013 | Sundaresan et al. | |
| 8,799,265 B2 | 8/2014 | Johnson et al. | |
| 2007/0260450 A1* | 11/2007 | Sun | G06F 17/30625 704/9 |
| 2010/0036829 A1 | 2/2010 | Leyba | |

(Continued)

FOREIGN PATENT DOCUMENTS

| | | |
|---|---|---|
| CN | 102298642 B | 9/2012 |
| EP | 2400400 A1 | 12/2011 |

(Continued)

OTHER PUBLICATIONS

R. Stewart et al.; "Idea Navigation: Structured Browsing for Unstructured Text"; Apr. 5-10, 2008, Florence, Italy; ACM; 978-1-60558-011—Jan. 8, 2004.

(Continued)

*Primary Examiner* — Daniel Abebe
(74) *Attorney, Agent, or Firm* — Miles & Stockbridge P.C.

(57) ABSTRACT

A system for performing semantic search receives an electronic text corpus and separates the text corpus into a plurality of sentences. The system parses and converts each sentence into a sentence tree. The system receives a search query and matches the search query with one or more of the sentence trees.

25 Claims, 10 Drawing Sheets

(56) References Cited

U.S. PATENT DOCUMENTS

| | | | |
|---|---|---|---|
| 2011/0270607 A1* | 11/2011 | Zuev | G06F 17/27 |
| | | | 704/9 |
| 2011/0276581 A1 | 11/2011 | Zelevinsky | |
| 2013/0013291 A1 | 1/2013 | Bullock et al. | |
| 2013/0060562 A1* | 3/2013 | Tsuboi | G06F 17/30684 |
| | | | 704/9 |
| 2014/0019122 A1 | 1/2014 | New | |
| 2014/0163955 A1 | 6/2014 | Ng Tari et al. | |
| 2016/0253333 A1* | 9/2016 | Galitsky | G06F 17/30634 |

FOREIGN PATENT DOCUMENTS

| | | |
|---|---|---|
| JP | 2009-199280 A | 9/2009 |
| KR | 10-2014-0053717 A | 5/2014 |

OTHER PUBLICATIONS

"Python Text Processing With NLTK 2.0: Creating Custom Corpora", https://www.packtpub.com/books/content/python-text-processing-nltk-20-creating-custom-corpora; last downloaded Jul. 7, 2015.

* cited by examiner

SEMANTIC TEXT SEARCH

CROSS REFERENCE TO RELATED APPLICATIONS

This application claims priority of Provisional Patent Application Ser. No. 62/053,283, filed on Sep. 22, 2014, the contents of which is hereby incorporated by reference.

FIELD

One embodiment is directed generally to a computer system, and in particular to a computer system that provides searching of a text corpus.

BACKGROUND INFORMATION

As the volume of text-based content available continues to grow exponentially, both on the Internet and other content repositories, such as behind-the-firewall data, the importance of search engines and search technology is reinforced. Virtually every user employs one or more search engines to locate relevant content on a frequent basis. With the large quantity of material available, various tools and methods for the refinement of search engine results have been created with varying degrees of success.

The most popular search engines available primarily follow the interaction model of the user entering a set of text search terms through a search engine interface, and the text search terms are then used to extract a result set from the index created or administered by the search engine. However, one of the limitations of a purely text-based search is that if a text search term is used that can have more than one definition or meaning, the result set which is retrieved will not be as focused or relevant to the topic of interest as might be desired. An additional limitation occurs when the user enters more than one search term. Many search engines limit their interpretation of such multi-term query as a simple request to locate all documents that contain all search query terms or some logical combination or simple variation (e.g., stemming) thereof. Results of this type of search have generally been unsatisfactory for all but the most basic text document retrieval tasks.

Specifically, although meaning is communicated via words, the typical text or keyword search does not search for the meaning. The creator of the text to be searched has encoded a certain meaning inside the text. Similarly, the person initiating a search encodes desired meaning in a keyword query. The search will return the "correct" result only if both encodings coincide.

SUMMARY

One embodiment is a system for performing semantic search. The system receives an electronic text corpus and separates the text corpus into a plurality of sentences. The system parses and converts each sentence into a sentence tree. The system receives a search query and matches the search query with one or more of the sentence trees.

BRIEF DESCRIPTION OF THE DRAWINGS

FIGS. 4A, 4B and 4C illustrate a screenshot showing parsed sentences and hypernym matching in accordance with embodiments of the invention.

FIGS. 5A and 5B illustrate screenshots of a semantic search user interface in accordance with embodiments of the invention.

DETAILED DESCRIPTION

The problem of getting a satisfactory answer to a user query by the electronic searching of a massive volume of electronic documents existed since the early days of computers; however, it has not been fully solved. There have been many different approaches to locating a set of documents to match a user's query, including such well-known search engines including "Google" search from Google Inc. and "Bing" search from Microsoft Corp.

It is well known that keyword searching using the omnipresent search box is insufficient for supporting many common information seeking tasks. One possible searching technique to improve results is disclosed in Stewart et al., "*Idea Navigation: Structured Browsing for Unstructured Text*", Proceedings of the SIGCHI Conference on Human Factors in Computing Systems, pp. 1789-1792 (2008 ACM), which is herein incorporated by reference.

The embodiments described herein give improved technical solutions to the problem of searching the massive volumes of electronic documents for useful information. The purpose of the examples given are only to illustrate the embodiments of the invention. The actual use cases for the embodiments of the invention include the searching of a text corpus of arbitrary size, possibly including millions or more electronic documents (e.g., emails, articles, books, web pages, tweets, etc.), where the sheer number of words makes any searching for information manually impractical or near impossible, while the precision/recall tradeoffs inherent in keyword search make the approach useless for the cases where high recall or high precision are required.

One embodiment is a system that performs semantic text search by converting each sentence of a text corpus into a tree. A search query is then also converted into a tree and/or interpreted as a tree, and the search tree is matched with one or more of the text corpus trees. As a result of the match, a response of documents that correspond to the search query is generated. In addition, refinements of related queries can be generated. The use of tree matching provides for a semantic-based search. Another embodiment of the present invention can locate the entities of interest, such as brand or product names, and perform high-precision sentiment extraction based on the other terms that modify such entities of interest.

In general, embodiments find text based not only on the words, but also on the way the words act upon and modify each other. Other embodiments apply additional knowledge bases by enriching the text with additional information such as synonyms. Embodiments augment text with additional semantic knowledge to allow high recall during retrieval, and utilize as much underlying structure of the text as possible, to obtain high precision.

Figure 1:
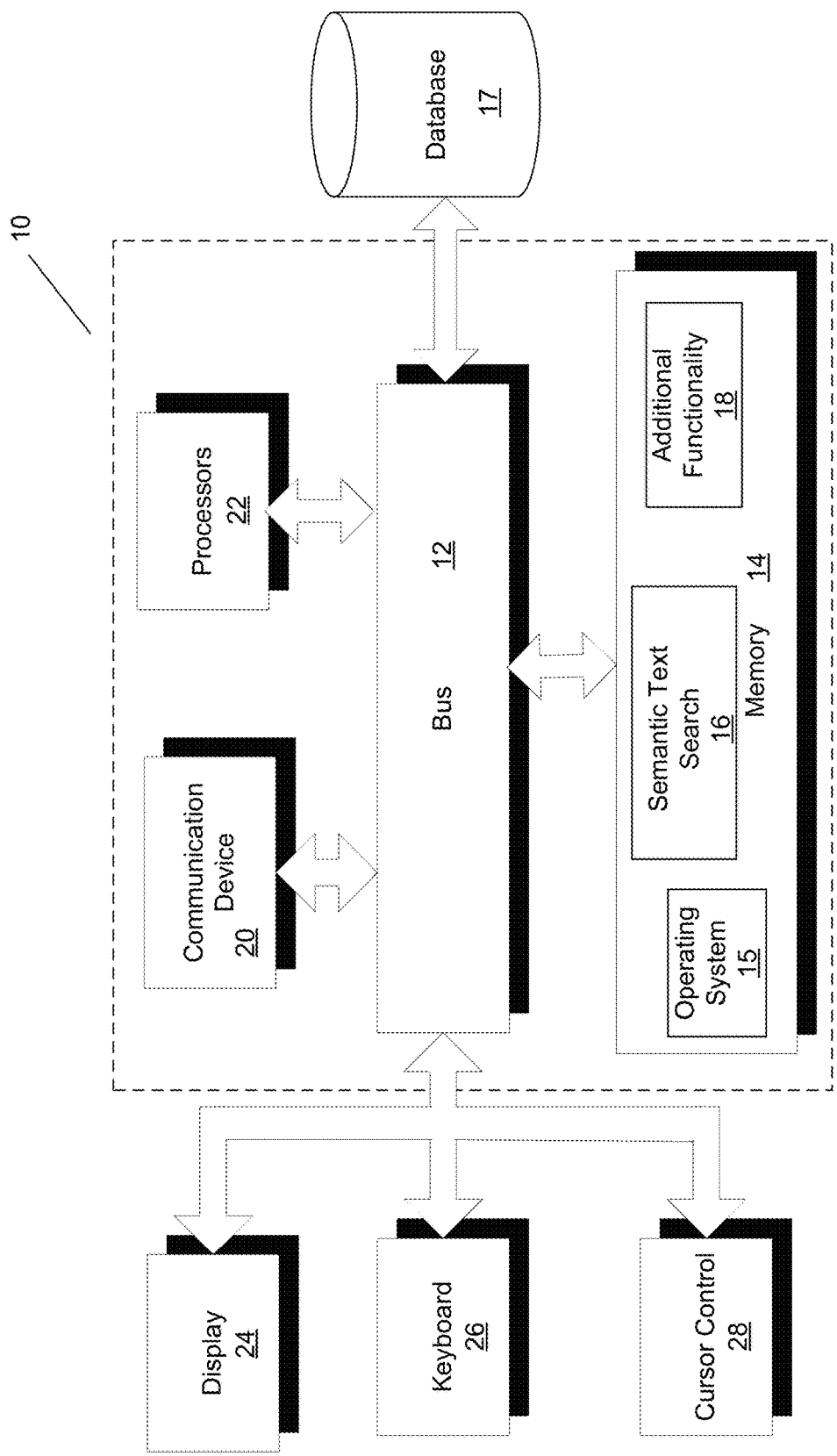
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a server that performs semantic text search, system 10 may not include peripheral devices such as keyboard 26 and cursor control 28.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include semantic text search module 16 for providing semantic text search, and all other functionality disclosed herein. System 10 can be part of a larger system. Therefore, system 10 can include one or more additional functional modules 18 to include the additional functionality. A database 17 is coupled to bus 12 to provide centralized storage for modules 16 and 18 and store a text corpus, trees, etc.

In another embodiment, there is a first server or servers which locate and download electronic documents from either the Internet or Intranet or any combination thereof. These documents are then stored in a database (e.g., Structured Query Language ("SQL") or Not only SQL ("NoSQL"), or any combination thereof). A second server or servers have semantic text search software that when executed by the second server processors using the documents stored in the database performs the functionality shown in FIG. 2. The search query, in one embodiment, is received at 210 via a Graphical User Interface ("GUI") that is displayed on a Personal Computer ("PC"), mobile phone or other mobile device.

Figure 2:
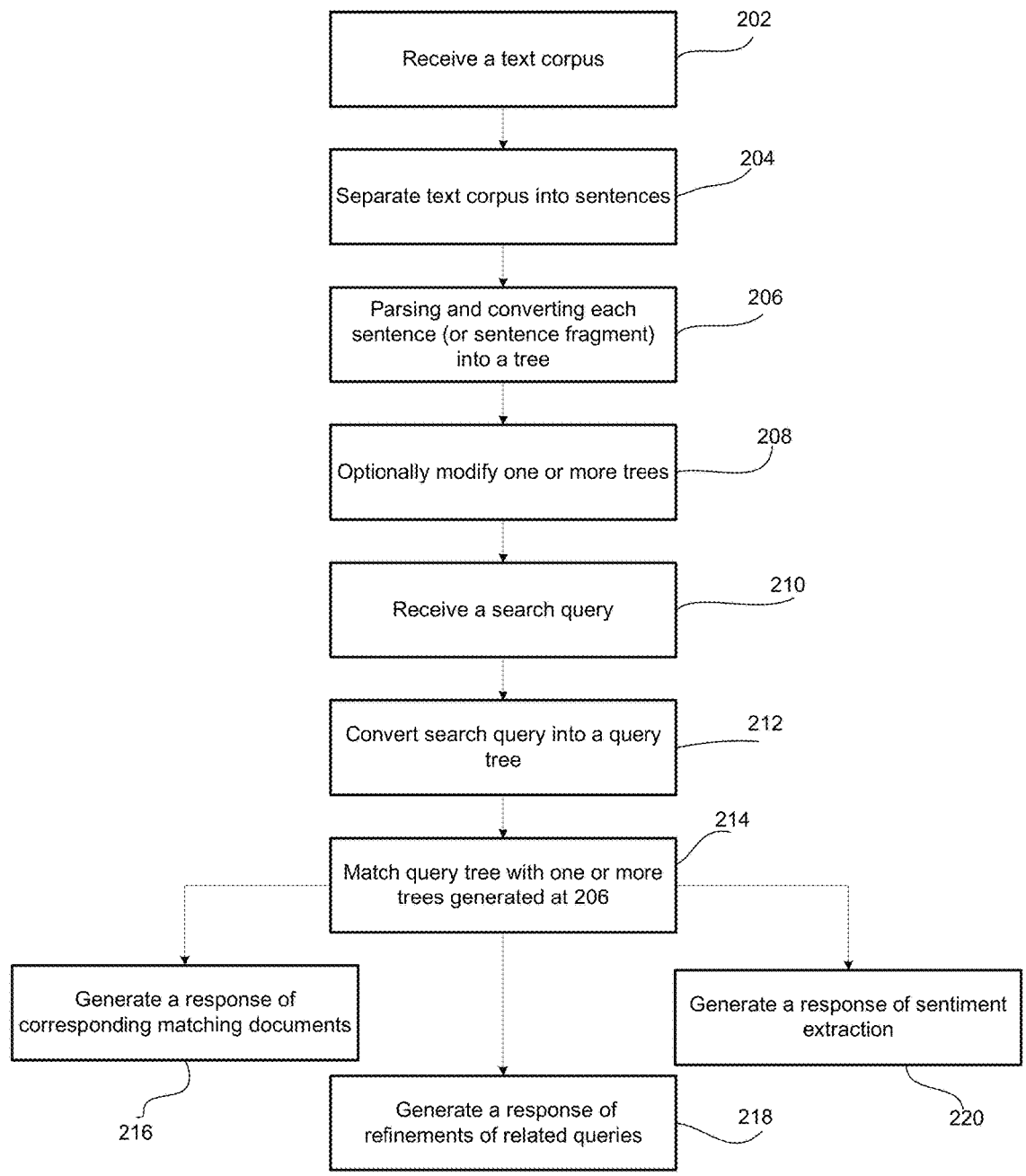
FIG. 2 is a high-level flow diagram of the functionality of a semantic text search module and other elements of FIG. 1 in accordance with one embodiment of the present invention.

FIG. 2 is a high-level flow diagram of the functionality of semantic text search module 16 and other elements of FIG. 1 in accordance with one embodiment of the present invention.

In one embodiment an electronic document(s) (or "document(s)" herein) is any information recorded in a manner that requires a computer or other electronic device to display, interpret, and process it. This includes documents generated by software and stored on volatile and/or non-volatile storage. Some examples include articles, electronic mail, web pages, tweets, unstructured text records, or any combination thereof. The electronic document includes some electronic parsable text.

A text corpus is understood as a group of one or more electronic documents. Examples of a text corpus include the entire Internet, an electronic library, or a document repository.

At 202, a text corpus is received. The text corpus can be stored on database 17 of FIG. 1, or any remote or local volatile or non-volatile memory.

At 204, the text corpus is separated into sentences.

At 206, each sentence (or sentence fragment) is parsed and converted into a tree (i.e., a "sentence tree"). The sentence parse can be the grammatical parse or a sentence diagram. To obtain such a parse, different embodiments can use various available computer-implemented natural language parsers, including, but not limited to, "The Stanford Parser: A statistical parser", "ClearNLP", and others. Each tree is formed of nodes corresponding to each term in the sentence, connected by edges. The edges provide the grammatical relations of the connected nodes. For example, an edge can indicate that one term is a modifier of another term connected by the edge.

Figure 3:
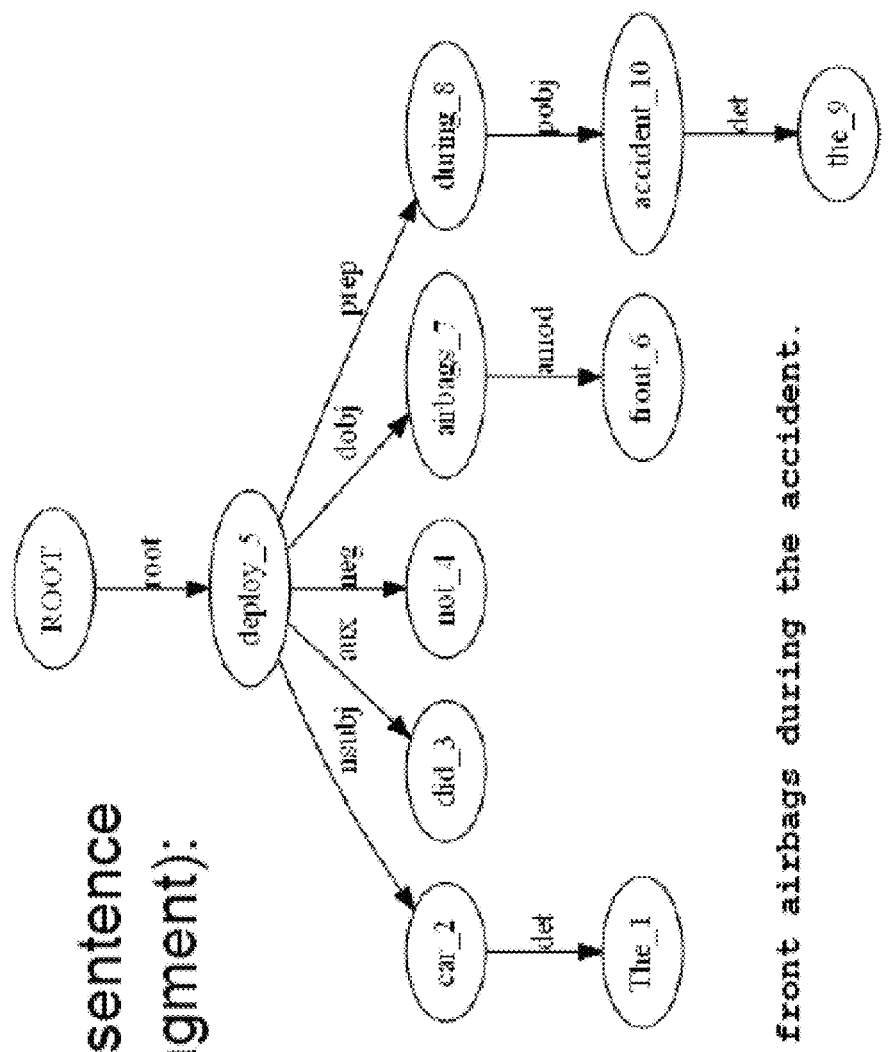
FIG. 3 illustrates an example tree formed by parsing the sentence: "The car did not deploy front airbags during the accident" in accordance with one embodiment.

FIG. 3 illustrates an example tree formed by parsing the sentence: "The car did not deploy front airbags during the accident" in accordance with one embodiment. The nodes include the words in the sentence: "deploy", "car", "did", "not", "airbags", "during", "the", "front", "accident", and "the". The edges include the grammatical relations of the nodes. For example, "car" is the noun subject ("nsubj" edge) of "deploy", and "airbags" is the direct object ("dobj" edge) of "deploy".

In another embodiment, the parse tree can include nodes which include the words in the sentence and each node can include a type (i.e., the syntactic function (e.g., subject, verb, object)), and the edges can include dependencies between nodes (i.e., all or part of the structure of the parse tree). For example, car [subject] is dependent on deploy, so taken with car's type [Subject], car is the subject of deploy [type ROOT]. The edges may optionally include a type (e.g., direct object or indirect object). For example, the sentences "Joe passed the salt shaker." and "Joe passed the salt shaker to his father." have "salt shaker" as a direct object in both sentences and "his father" as an indirect object in the second sentence. The first parse tree of the first sentence may have an edge with type: direct object, while the second parse tree of the second sentence may also include an edge with type: indirect object.

At 208, one or more trees from 206 are optionally modified. For example, trees can be split, trimmed, augmented with additional edges, edge types collapsed, etc. Article nodes can be dropped. Different embodiments can define "term" in different ways: one embodiment can interpret each word as a separate term. Other embodiments can perform dictionary lookup or use statistical or natural language processing techniques to identify multi-word sequences such as "United States" or "chief of staff" as single terms.

In another embodiment, one or more nodes can be expanded to include synonyms, hypernyms, hyponyms, and/or other related words or phrases. These related words or phrases can be organized inside the node as a flat list or as a more complicated structure, such as a tree. In addition, edges can also be collapsed or expanded. For example, in the sentence "Joe passed the salt shaker to his father.", the edge with the type indirect object "his father" and the edge with the direct object edge "salt shaker" can be both converted into the generic "object" type edge. Different embodiments can expand the edge types, for example by both retaining the original edge type (direct object, indirect object) and adding the broader type of a generic "object" type on top of that.

At 210, a search query is received. The query can consist of a single term, several terms, or be in the form of a complete sentence.

At 212, the query is optionally interpreted as a tree and/or is converted into a tree (i.e., a "query tree"). In one embodiment, the query is interpreted as a tree even if it contains only a single term (i.e., a one node tree). In another embodiment, refinements are generated/suggested to the user to add more related terms, and the refinements lead to the creation of a tree. The query can be converted into a tree (e.g., an automatic conversion into a tree by parsing), or through a mechanism that only allows a user to construct a query of a connected tree that is built through suggested refinements.

At 214, the tree generated in response to the query (or just the query itself if the query is not converted into a tree) is matched with one or more sentence trees generated from the text corpus at 206. In one embodiment, the matching determines if the query tree is a subtree of any of the sentence trees. Tree matching can be performed either strictly (i.e., the match is considered positive if the exact matching set of nodes is connected in exactly the same way by the exactly matching set of nodes) or approximately (i.e., the nodes can be the same but the edges can differ, or the same set of edges can connect only a subset of the query nodes, etc.).

At 216, in response to the matching trees, a response of corresponding matching documents is generated. Specifically, the documents that include the sentences that correspond to the matching trees are selected as matching documents.

At 218, in response to the matching trees, refinements of related queries are generated based on the matches to build the query tree into a bigger tree. As the result of this, users can refine their search based on entities actually acting upon each other. For example, after the user searches for "car", refinement searches can be offered such as "drove car", "crashed car" and "car accident". The "car accident" query would only return the documents where the accident was a car accident. Therefore, it would not return the document that included "we saw a train accident from our car". Different embodiments can suggest broadening refinements (where the suggested query is a subtree of the current query) or lateral refinements (where a term or an edge is replaced with another term or edge).

The refinement process could be iterated for as many steps as desired. The query "drove car" would return future refinements such as "John drove car". This latter query is different from regular text search, as the semantic search would not match documents that include "Peter drove the car, while John stayed home" and different from phrase search, as a phrase search for "John drove car" would not match the text "John, my neighbor, drove my car", while semantic search in accordance to embodiments would match it correctly because it understands the meaning encoded in the sentence structure.

Further, refinements can be grouped by the edge type. For example, if the current query is "drove car", refinements can be grouped by subjects ("John drove car", "Peter drove car"); adjectives ("drove old car", "drove new car"); adverbs ("drove car carelessly", "drove car carefully"); etc.

At 220, in response to the matching trees, sentiment extraction is performed in some embodiments. For example, if the search term is a company called "Ace", all sentiment such as modifiers of "terrible", "great", etc., that are grammatically linked to the search term are retrieved. Sentences that merely contain modifiers that do not modify the target search term will not be counted (i.e., "Used Acme product on my terrible ride home" will not return negative sentiment for the term "Acme").

In another embodiment, in addition to an ingested text corpus, other sources are used to enrich the trees generated at 206. The other sources can be external taxonomies that provide tree-like structures, such as "WordNet®" from Princeton University, which provides senses, or Wikipedia, which organizes concepts according to various taxonomies, such as a taxonomy of geographical locations, related terms, or categories. As a result, hypernyms, hyponyms, synonyms, etc., can be generated in response to query terms. In general, a "hyponym" is a word or phrase whose semantic field is included within that of another word, its "hypernym." In other words, a hyponym shares a type-of relationship with its hypernym. For example, pigeon, crow, eagle, and seagull are all hyponyms of bird (their hypernym), which, in turn, is a hyponym of animal.

For example, if it is known that every "car" is a "vehicle" and every "crash" is an "accident", a search can be performed for "vehicle accident", and every instance of "car crash" can be located. The reverse would not be true, since there are vehicles other than cars and accidents other than crashes. Other taxonomies can be applicable as well. For example, a geographic taxonomy would allow a search for "crime in Massachusetts" to retrieve a reference to "jaywalking in Boston".

Further, in one embodiment, anaphora resolution is used to generate a semantic search result. For example, if the text corpus includes the text "John drove the car. He crashed it.", embodiments can infer who crashed what, and return the second sentence to the queries "John crashed" and "crashed car".

Figure 4A:
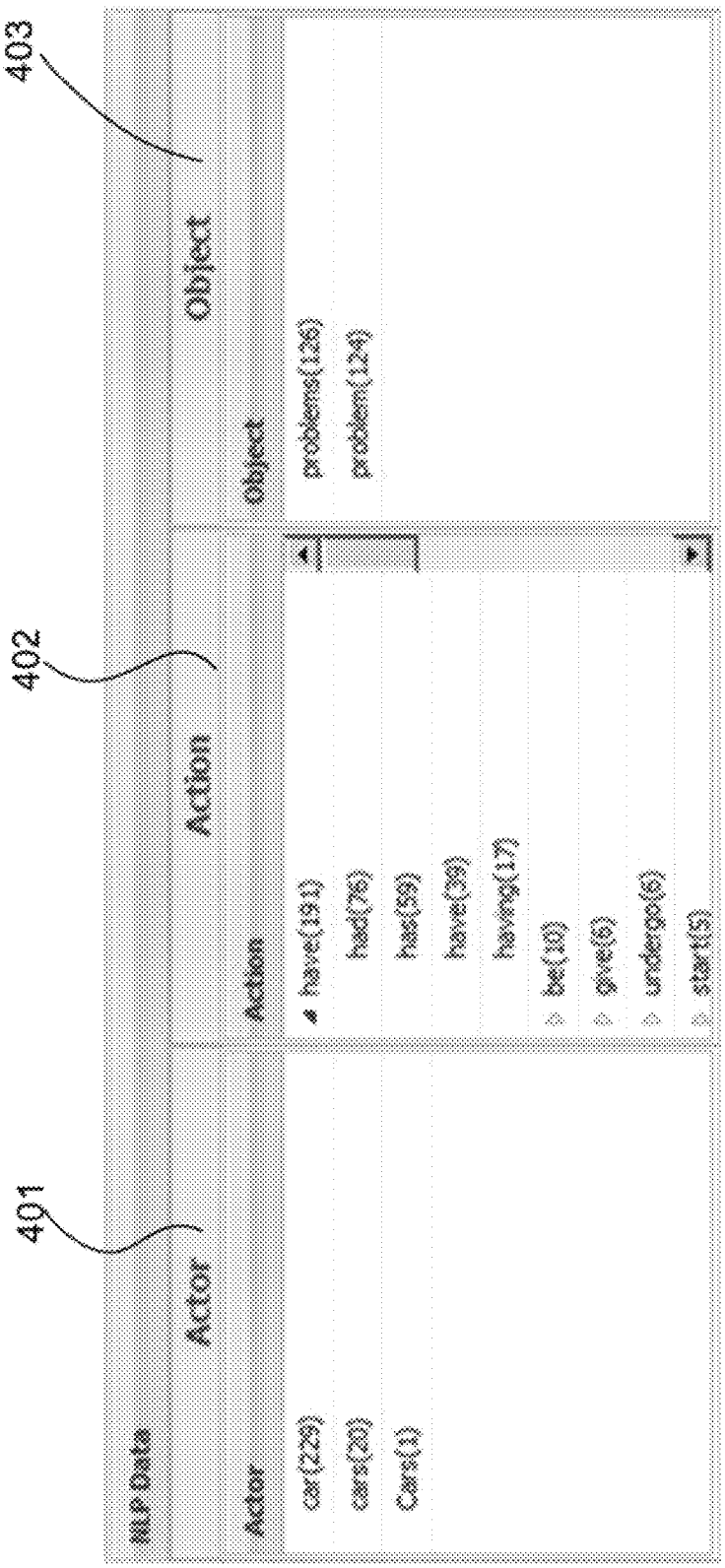
Figure 4C:
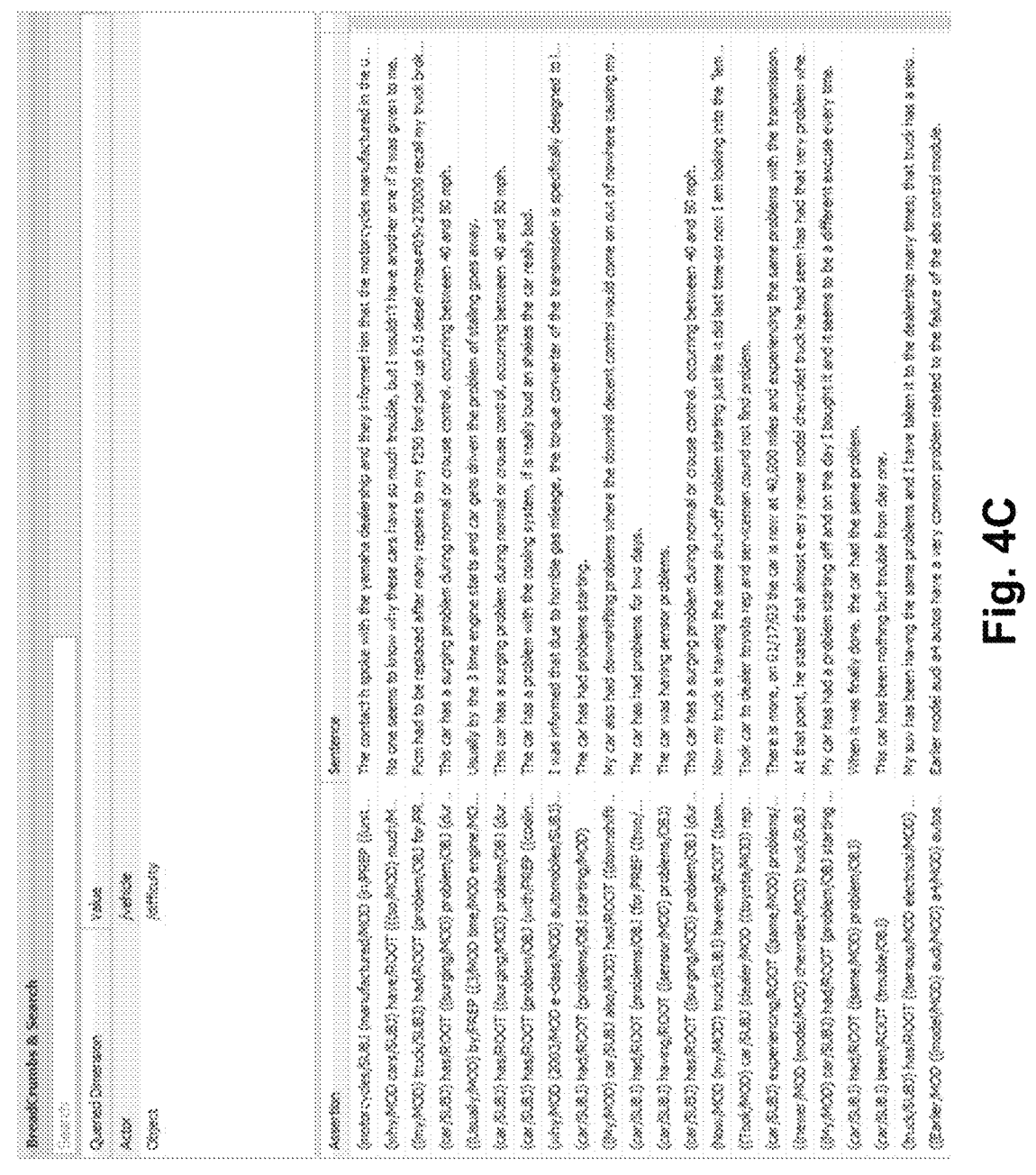

FIG. 4 illustrates a screenshot from a GUI showing parsed sentences and hypernym matching in accordance with embodiments of the invention. FIG. 4a illustrates the left side of the screenshot, FIG. 4b illustrates the right side of the screenshot and FIG. 4c illustrates an enlarged unstructured text example. The sentences are parsed into trees with nodes for actor 401, action 402 and object 403. The parsed trees and corresponding sentences from the text corpus that match the query "actor=/vehicle/car AND object="/difficulty/problem" are shown at 410 and 411, illustrating the matching of the trees that include the hypernym hierarchies. In this embodiment, this query causes the retrieval of all parse trees where the Actor node matches the term "car" with the hypernym "vehicle", and the Object node matches the term "problem" with the hypernym "difficulty". Some embodiments only use selected nodes from the hypernym/hyponym trees, skipping the others. For example, Princeton's WordNet v3.1 contains the following hypernym trees:

S: (n) car, auto, automobile, machine, motorcar (a motor vehicle with four wheels; usually propelled by an internal combustion engine) "he needs a car to get to work"

...

/ inherited hypernym /
    S: (n) motor vehicle, automotive vehicle (a self-propelled wheeled vehicle that does not run on rails)
        S: (n) self-propelled vehicle (a wheeled vehicle that carries in itself a means of propulsion)
            S: (n) wheeled vehicle (a vehicle that moves on wheels and usually has a container for transporting things or people) "the oldest known wheeled vehicles were found in Sumer and Syria and date from around 3500 BC"
                S: (n) vehicle (a conveyance that transports people or objects)
S: (n) problem, job (a state of difficulty that needs to be resolved) "she and her husband are having problems"; "it is always a job to contact him"; "urban problems such as traffic congestion and smog"

...

/ direct hypernym /
    S: (n) difficulty (a condition or state of affairs almost beyond one's ability to deal with and requiring great effort to bear or overcome) "grappling with financial difficulties"

Certain embodiments can skip the "motor vehicle", "self-propelled vehicle", and "wheeled vehicle" hypernyms, directly connecting the term "car" to the hypernym "vehicle".

Figure 5A:
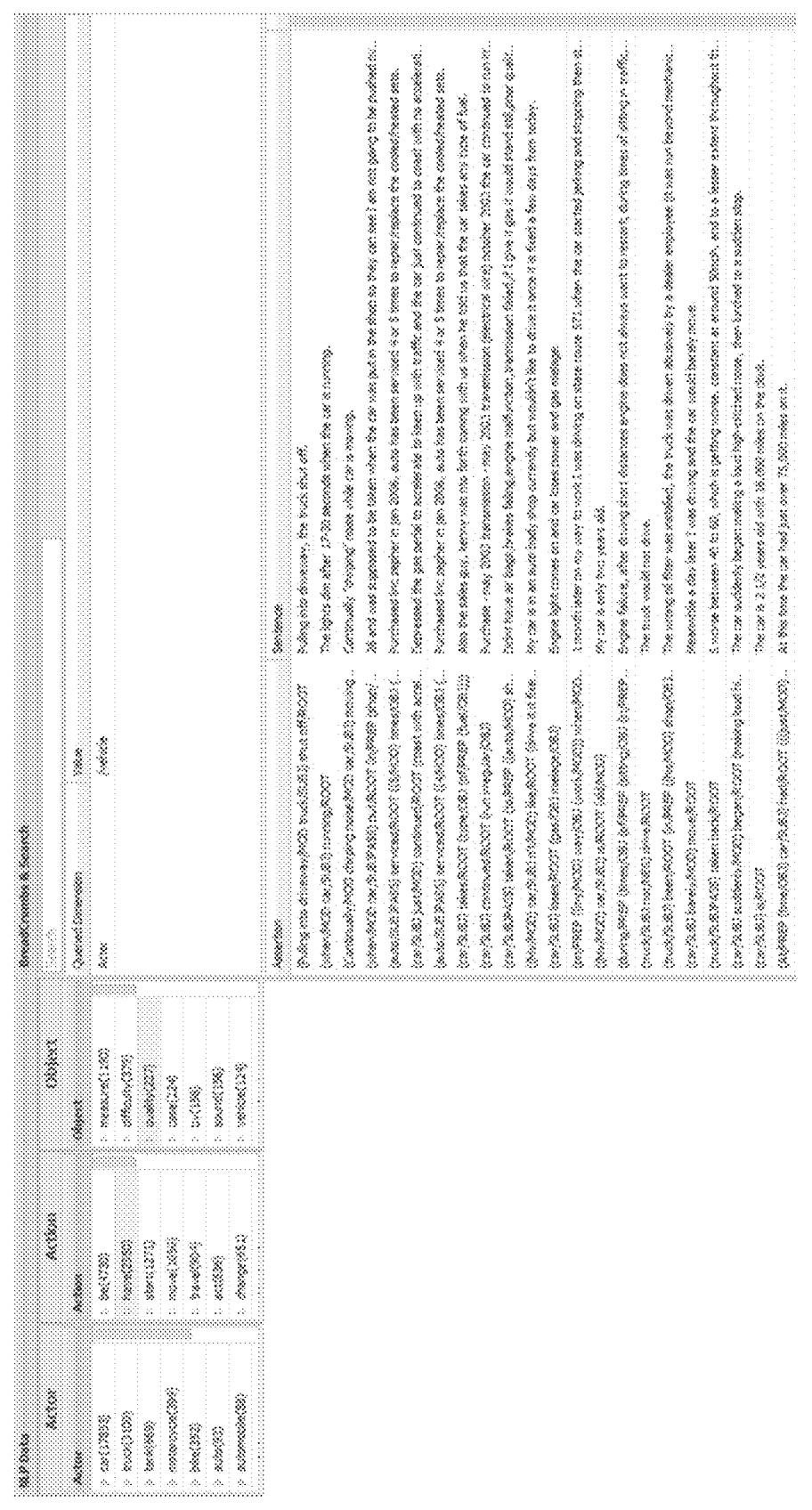

FIG. 5a illustrates a screenshot of one embodiment, where the user searched for every document that matches the query "ACTOR=/vehicle", with the leading backslash "/" indicating that the user is interested in hypernyms. For this query, every matching actor (car, truck, motorcycle, etc.) is a particular type of a vehicle. The word "vehicle" does not need to appear in the text of the document for it to be matched.

Figure 5B:
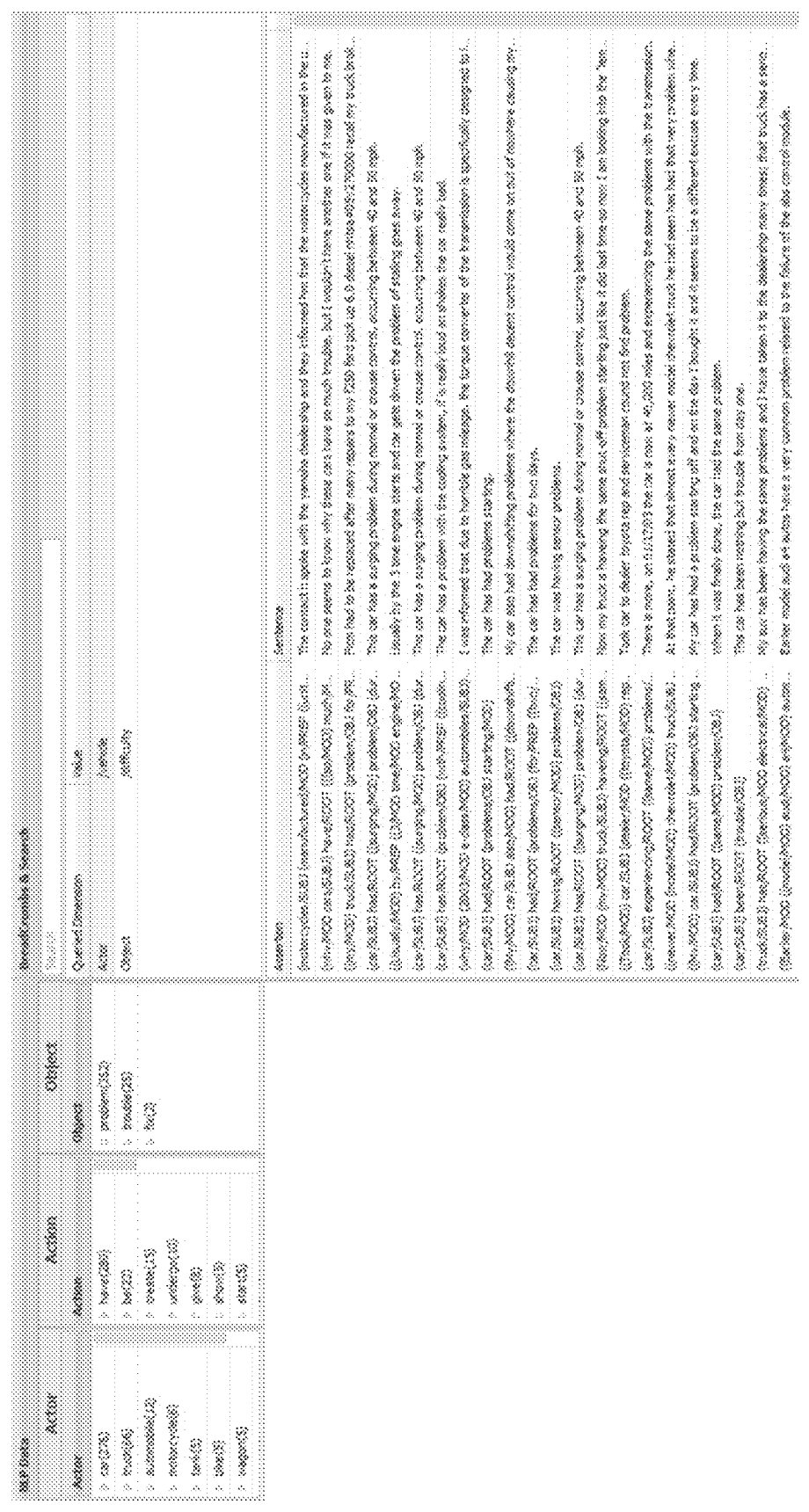

FIG. 5b illustrates a subsequent step of navigation of one embodiment, where the user further refined the search by filtering the "ACTOR=/vehicle" query by only returning the documents that also match "OBJECT=/difficulty" query. As the result, only those documents that refer to any kind of vehicle (car, truck, etc.) experiencing any kind of difficulty (problem, trouble, etc.) are returned.

Other embodiments of the present invention do not require the user to explicitly specify what field of a parsed text the user is interested in. In such an embodiment, a query for "vehicle" would return all instances of "vehicle", whether they are actors, objects, or possibly other nodes of parsed trees. Likewise, in some embodiments the users are not required to explicitly specify they are interested in hypernyms. In such embodiments the query "vehicle" would return both the documents where the verbatim text mentions "vehicle", as well as those documents where the entities (car, truck, etc.) have the term "vehicle" as a hypernym.

Some embodiments allow complicated query construction, where the query specifies not only nodes but also edges. In one embodiment that searches medical records, the user can specify the query that retrieves all nodes that match the terms "allergy" or "allergic", refine the resulting trees by the name of a particular medicine, and then further refine the resulting trees by the absence of a negative edge. Such a query would retrieve only the records of the patients who are allergic to the particular medicine.

Figure 6:
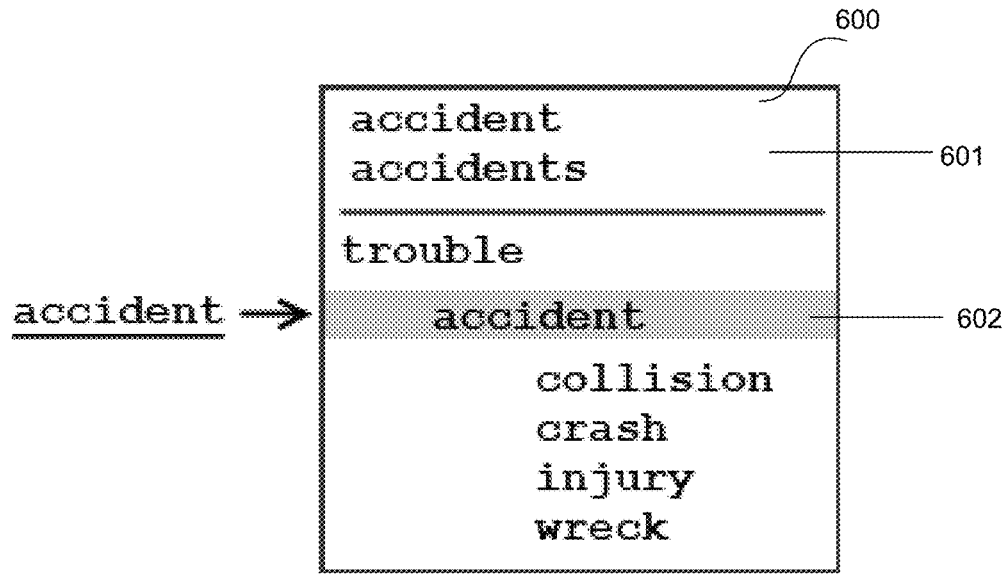
FIG. 6 illustrates screenshots of a single term modification via a user interface in accordance with one embodiment.
Figure 6:
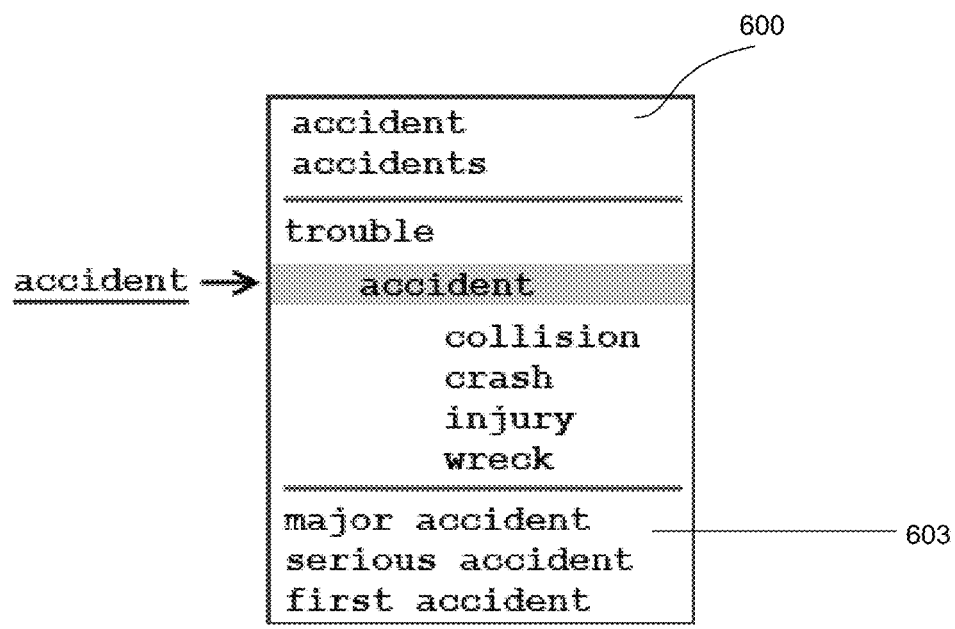

In some embodiments, a user is allowed to modify semantic search queries on a term-by-term basis. FIG. 6 illustrates screenshots of a single term modification via a user interface 600 in accordance with one embodiment. For the term "accident", the specific verbatim form is shown at 601, and the hyponym/hypernym options are shown at 602. Unavailable refinements may be grayed out.

In one embodiment, hierarchical term modification can be used for multiple hypernyms such as:

device > computer > apple
food > fruit > apple.

Such hierarchies also allow a user to perform sense disambiguation.

In one embodiment, breadcrumbs can be used for other enriched dimensions (e.g., geographical location, semantic role, etc.) such as:

U.S. > Massachusetts > Cambridge
U.K. > Cambridgeshire > Cambridge
Person > speaker > Larry Ellison
Person > investor > Larry Ellison.

In one embodiment, the query can be modified by exposing noun phrase modifiers as dynamic dimensions such as follows:

ACCIDENT
major accident (20)
serious accident (15)
first accident (12)
...

Such modifiers can also be included into the query modification UI 600, as shown at 603 of FIG. 6.

Tag clouds typically provide a set of frequent terms, given the query. However, in embodiments that use semantics, tag clouds can provides a set of frequent subtrees, given the query.

Embodiments bridge the gap between semantics and text (in other words, the meaning and its representation) by shifting the focus of search from tokens to the graph representation of the text, namely terms/entities as nodes and connections between them as edges. A prior art "bag of words" model does not distinguish between searches such as [theory group] and [group theory], and maps all senses of polysemic terms such as "Java" to the same token.

Embodiments use linguistic constructs known as "phrases". In English, a noun phrase can include a sequence of zero or more adjectives, followed by one or more nouns;

other embodiments may take into accounts articles and prepositions. A verb phrase is zero or more adverbs followed by one or more verbs. Embodiments further use typed entity extraction, where trained extractors mark up the corpus text for entities such as People, Places, or Organizations.

Exposing such entities to the user via information-scent-rich interfaces (related terms, lists, tag clouds, refinements) allows the user to select not just the terms of interest but the terms that are used to convey a particular meaning.

Meaning is encoded not only on the entity level, but also on the sentence level. Sentence structure expresses the way that entities act on and modify each other. Extraction of this information is essential to retaining the semantics of text.

One embodiment uses the extraction of actor/action/object triples (where action is a verb phrase, and actor and object are noun phrases). The sentence "The car did not deploy front airbags during the accident" can thus be parsed into one such triple: {car/did not deploy/front airbags}. Such parsing is lossy: it necessarily simplifies the sentence structure, including, in this example, the loss of the modifier "during the accident". However, it does extract a wealth of information from the sentence that is not accessible to the bag of words model.

Other embodiments do not constrain the extracted triples to the format described above. The "RDF schema" {subject/predicate/object} is a superset of the above. Such a schema supports the extraction of different types of entities and predicates.

One embodiment parses sentences or sentence fragments into graphs, with terms (subjects, objects, actions, modifiers, etc.) mapped to nodes in the graph, while predicates form (directed) edges. In one embodiment, the edges are mapped from the grammatical structure of the sentence, including edges that describe relationships between terms such as "clausal", "direct", "prepositional", etc. One taxonomy of such edges is disclosed in de Marneffe et al., "*Stanford typed dependencies manual*" (September 2008, Revised for the Stanford Parser v. 3.3 in December 2013).

Embodiments provide guided (or faceted) navigation that includes a user interface element that offers refining links (possibly with the count of records that would be obtained upon selection, or other indication of the record count, such as histogram bars) such as shown in FIG. 7.

Figure 7B:
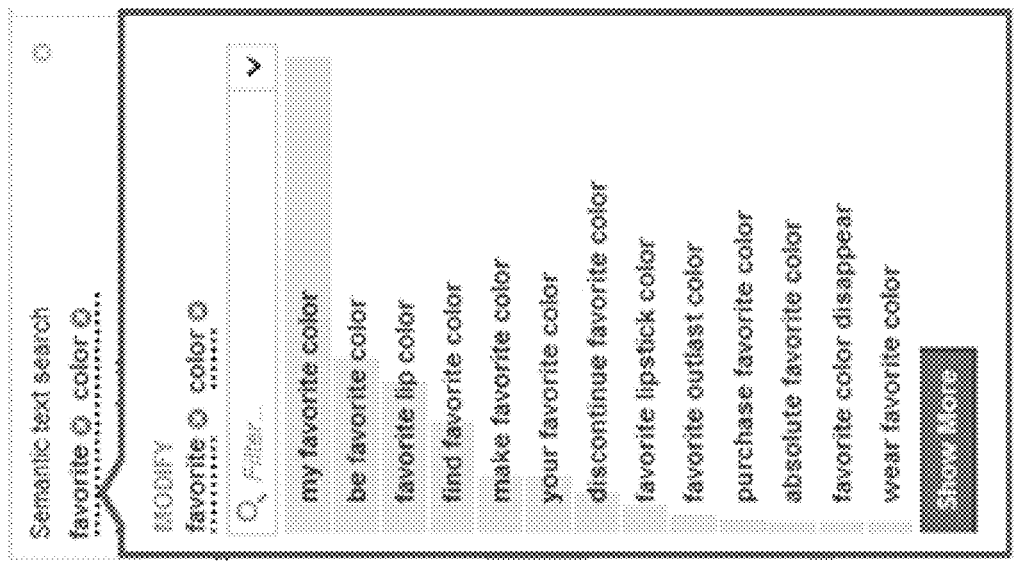
FIGS. 7A and 7B are example user interfaces that illustrate refinements and a summary of the result set in accordance with one embodiment.
Figure 7A:
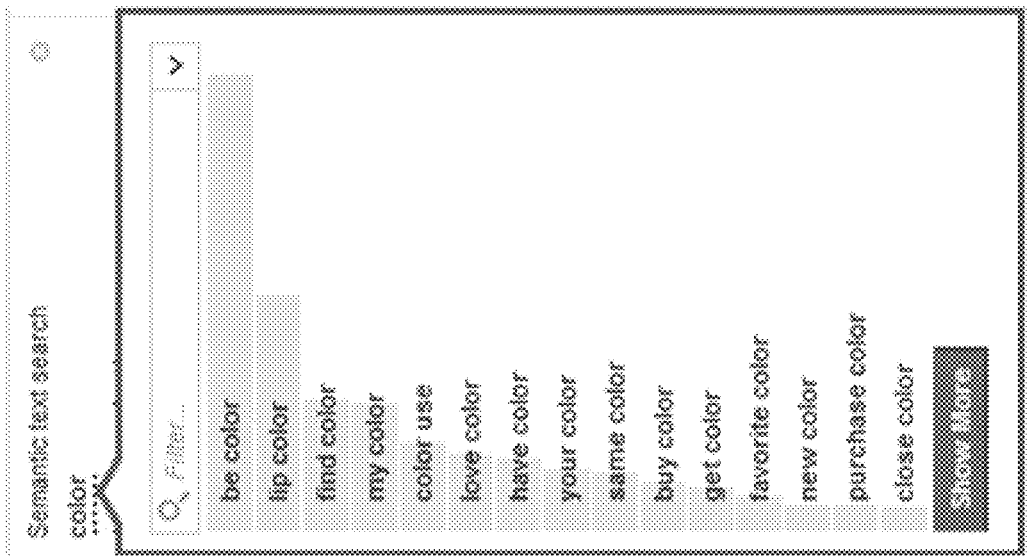

The guided navigation interface in one embodiment has a two-fold purpose. The refinements, on one hand, offer venues for narrowing down the result set. On the other hand, they offer the summary of the result set, which provides the semantic search aspect to the guided navigation user experience. FIGS. 7a and 7b are example interfaces that illustrate refinements and a summary of the result set in accordance with one embodiment.

In particular, selecting a particular term can cause an embodiment to display possible refining (more detailed) queries, by querying the database of parse trees and limiting the set of refining queries to those that contain the original term and one additional term, connected to the original one by a direct edge. Such refinements both represent to the user the semantic content of the current result set and suggest the possible direction of further navigation. The further refinements can be selected from the list, or the user can search for the terms of interest via the search box. FIG. 7a shows one such embodiment, where for the original search term "color", refinements such as "find color", "favorite color", and "color use" are suggested, along with the histogram bars indicating the frequency of each refinement.

Embodiments allow the same interaction model to be utilized at the very outset of the querying process, allowing the user to start by refining the entire collection of information via selecting a term or a set of terms from the database of parsed semantic trees, displayed in a manner identical to "tag clouds" or "word clouds".

As described, embodiments use the context to group tokens into entities and sentence structure to detect the way entities act on other entities. Further, embodiments use information outside of the corpus, such as augmenting each field of a parsed semantic tree with a more generic hierarchical parent value. In some embodiments, "WordNet®" can be used to locate a hypernym (a broadening synonym) for nodes such as nouns or verbs. For other embodiments, the head terms (in English, almost always the rightmost term of a phrase) can be used, such as using "airbags" for "front airbags", or "Clinton" for both "Hillary Clinton" and "Bill Clinton".

FIG. 7a illustrates the process where the user can start by searching for any term that expresses the search intent ("color"), and then proceed by selecting a refinement ("favorite color") to narrow down the result set. The embodiment then offers further possible refinements in FIG. 7b.

As disclosed, embodiments provide semantic text search by parsing sentences into trees and providing a mechanism to match such trees with user queries. The matching trees can generate a response of matching corresponding documents, refinements, or provide the set of sentiment-bearing terms to power sentiment extraction.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform semantic search, the semantic search comprising:
   receiving an electronic text corpus;
   separating the text corpus into a plurality of sentences;
   parsing and converting each sentence into a sentence tree;
   receiving a search query via a user interface;
   converting the search query into a search query tree;
   matching the search query tree with one or more of the sentence trees; and
   in response to the matching, providing refinements to the search query that correspond to the matched sentence trees, wherein the refinements comprise increasing the search query tree by adding one or more additional terms.

2. The computer-readable medium of claim 1, wherein the one or more additional terms are connected to search terms of the search query by a direct edge.

3. The computer-readable medium of claim 1, further comprising:
   in response to the matching, providing documents from the text corpus that correspond to the matched sentence trees.

4. The computer-readable medium of claim 1, wherein the refinements are implemented as refinement links on the user interface.

5. The computer-readable medium of claim 1, further comprising:
   in response to the matching, extracting sentiments for the search query that correspond to the matched sentence trees, the sentiments comprising modifiers to search terms of the query.

6. The computer-readable medium of claim 1, further comprising using a source external to the text corpus to enrich the sentence trees.

7. The computer-readable medium of claim 1, wherein the user interface displays hypernym matching for the search query tree.

8. The computer-readable medium of claim 1, further comprising modifying one or more of the sentence trees, wherein each sentence tree comprises nodes and at least one edge, and the modifying comprises at least one of: expanding a node, collapsing a node, expanding an edge, or collapsing an edge.

9. The computer-readable medium of claim 2, wherein the query tree comprises at least one node, further comprising:
    after the matching, allowing the user to further refine the semantic search by adding an additional node to the search query tree and repeating the matching.

10. The computer-readable medium of claim 1, further comprising, after receiving the search query, providing selectable refining search queries via the user interface.

11. A method of performing semantic search, the method comprising:
    receiving an electronic text corpus;
    separating the text corpus into a plurality of sentences;
    parsing and converting each sentence into a sentence tree;
    receiving a search query via a user interface;
    converting the search query into a search query tree;
    matching the search query tree with one or more of the sentence trees; and
    in response to the matching, providing refinements to the search query that correspond to the matched sentence trees, wherein the refinements comprise increasing the search query tree by adding one or more additional terms.

12. The method of claim 11, wherein the one or more additional terms are connected to search terms of the search query by a direct edge.

13. The method of claim 11, further comprising:
    in response to the matching, providing documents from the text corpus that correspond to the matched sentence trees.

14. The method of claim 11, wherein the refinements are implemented as refinement links on the user interface.

15. The method of claim 11, further comprising:
    in response to the matching, extracting sentiments for the search query that correspond to the matched sentence trees, the sentiments comprising modifiers to search terms of the query.

16. The method of claim 11, further comprising using a source external to the text corpus to enrich the sentence trees.

17. The method of claim 11, wherein the user interface displays hypernym matching for the search query tree.

18. The method of claim 11, further comprising modifying one or more of the sentence trees, wherein each sentence tree comprises nodes and at least one edge, and the modifying comprises at least one of: expanding a node, collapsing a node, expanding an edge, or collapsing an edge.

19. A semantic text search query system comprising:
    a processor;
    a storage device coupled to the processor, wherein the storage device stores a plurality of sentence trees that are formed by separating a text corpus into a plurality of sentences and parsing and converting each sentence into one of the sentence trees;
    wherein the processor is adapted to generate a user interface that receives a search query and convert the search query into a search query tree; and
    the processor is adapted to match the search query tree with one or more of the sentence trees and, in response to the matching, provide refinements to the search query that correspond to the matched sentence trees, wherein the refinements comprise increasing the search query tree by adding one or more additional terms.

20. The semantic text search query system of claim 19, wherein the one or more additional terms are connected to search terms of the search query by a direct edge.

21. The semantic text search query system of claim 19, the processor further adapted to, in response to the match, providing documents from the text corpus that correspond to the matched sentence trees.

22. The semantic text search query system of claim 19, wherein the refinements are implemented as refinement links on the user interface.

23. The semantic text search query system of claim 19, the processor further adapted to, in response to the match, extracting sentiments for the search query that correspond to the matched sentence trees, the sentiments comprising modifiers to search terms of the query.

24. The semantic text search query system of claim 20, the processor further adapted to, in response to the matching, displaying hypernym matching for the search query tree on the user interface.

25. The semantic text search query system of claim 19, the processor further adapted to modify one or more of the sentence trees, wherein each sentence tree comprises nodes and at least one edge, and the modify comprises at least one of: expanding a node, collapsing a node, expanding an edge, or collapsing an edge.

* * * * *